Sept. 15, 1942.                 C. F. LOCKHART                    2,296,170
        MEANS FOR AUTOMATICALLY CONNECTING AND DISCONNECTING
                    FLUID PRESSURE PIPES OF CARS
                        Filed May 6, 1941            5 Sheets-Sheet 5
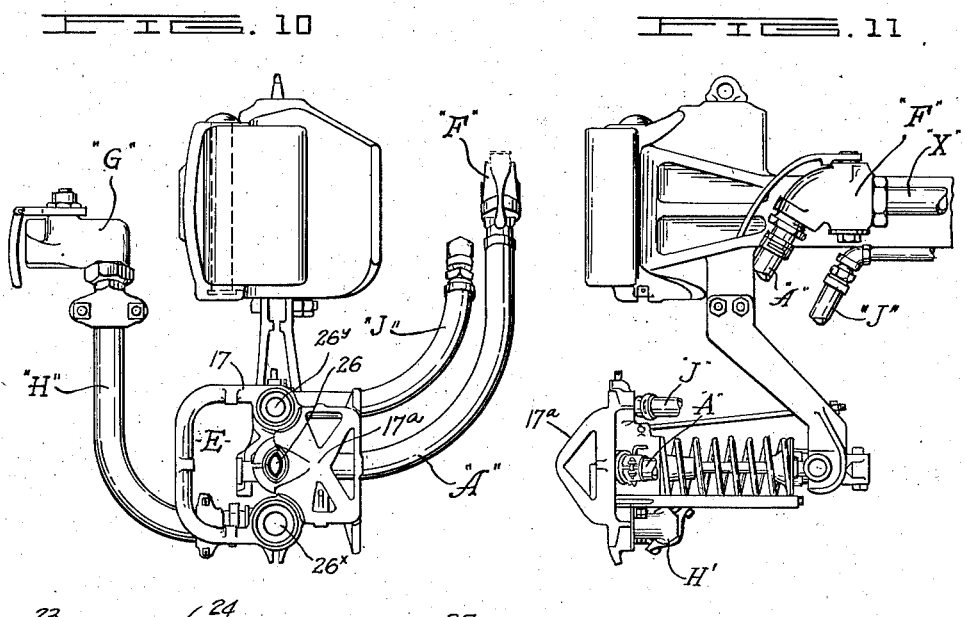
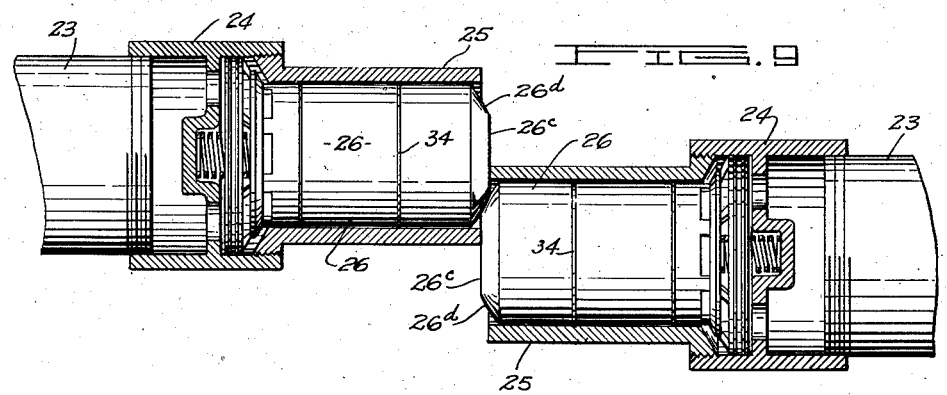
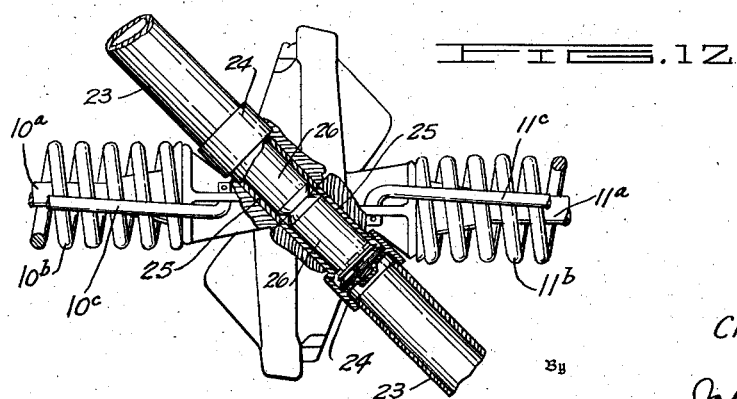
Inventor
Charles F. Lockhart
By
John B. Hull
Attorney Patented Sept. 15, 1942

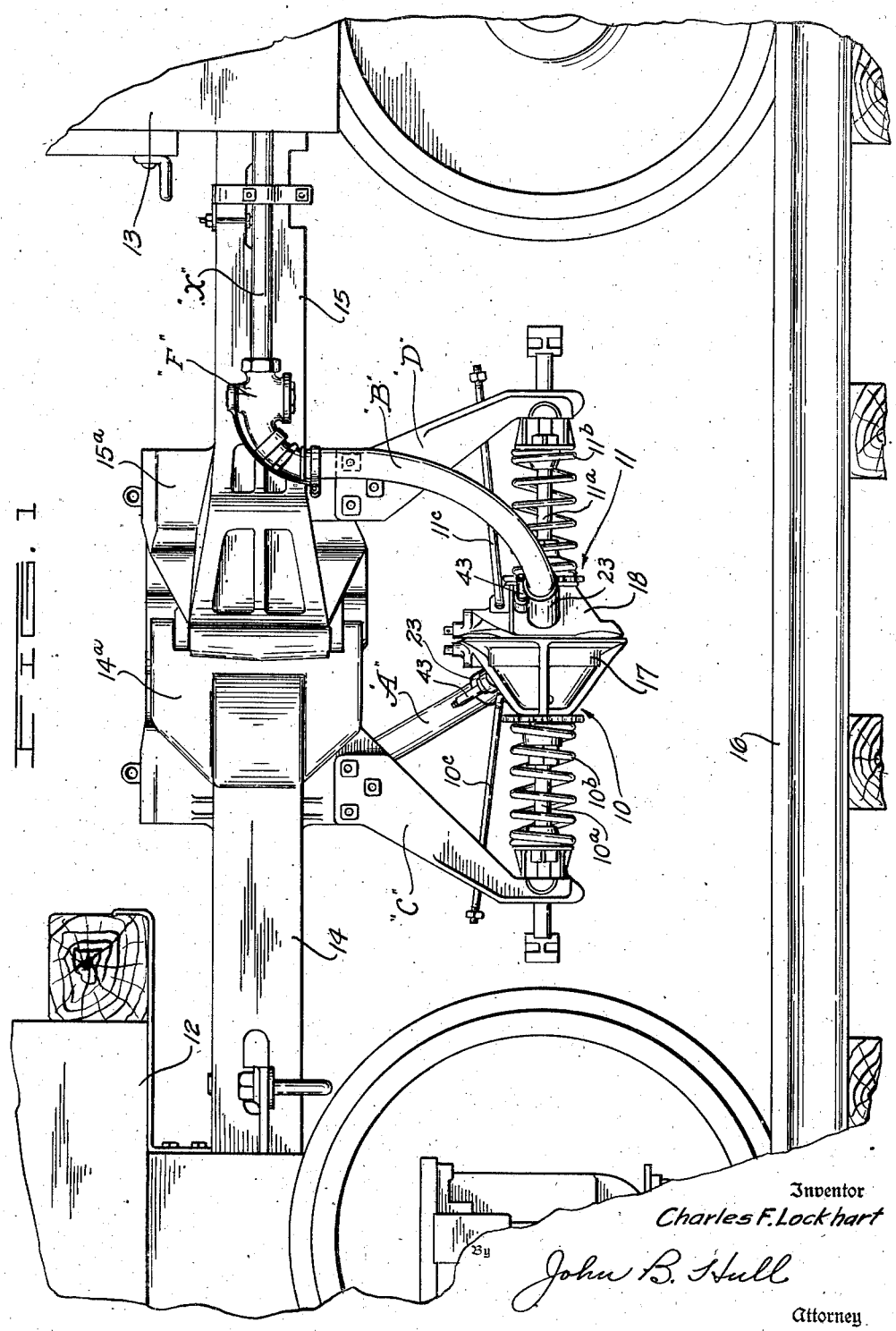

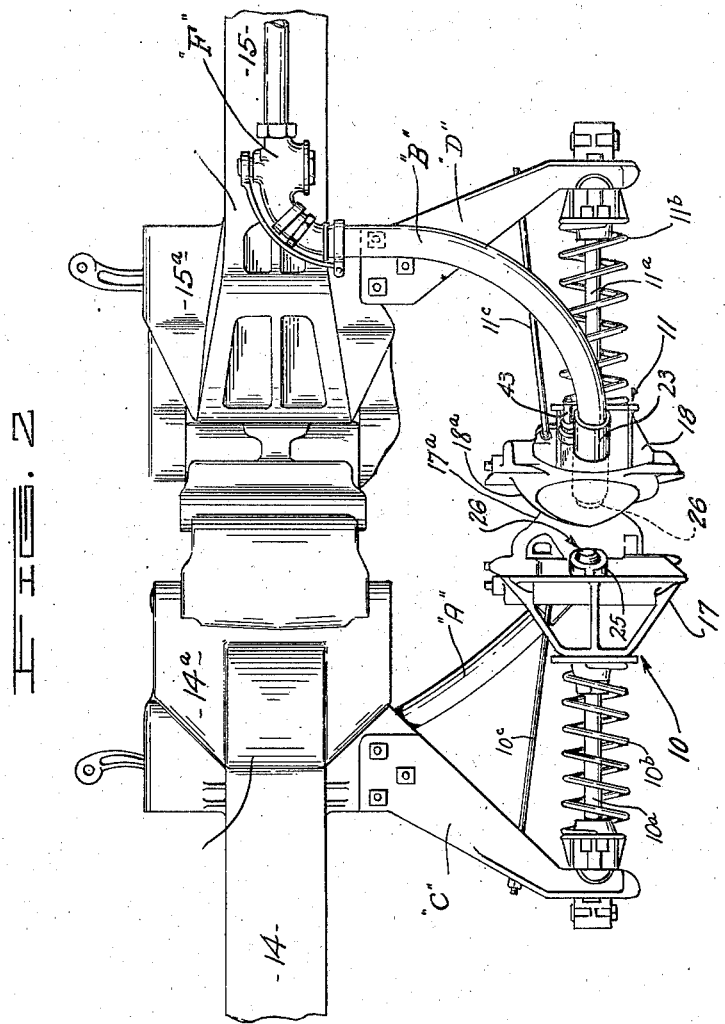

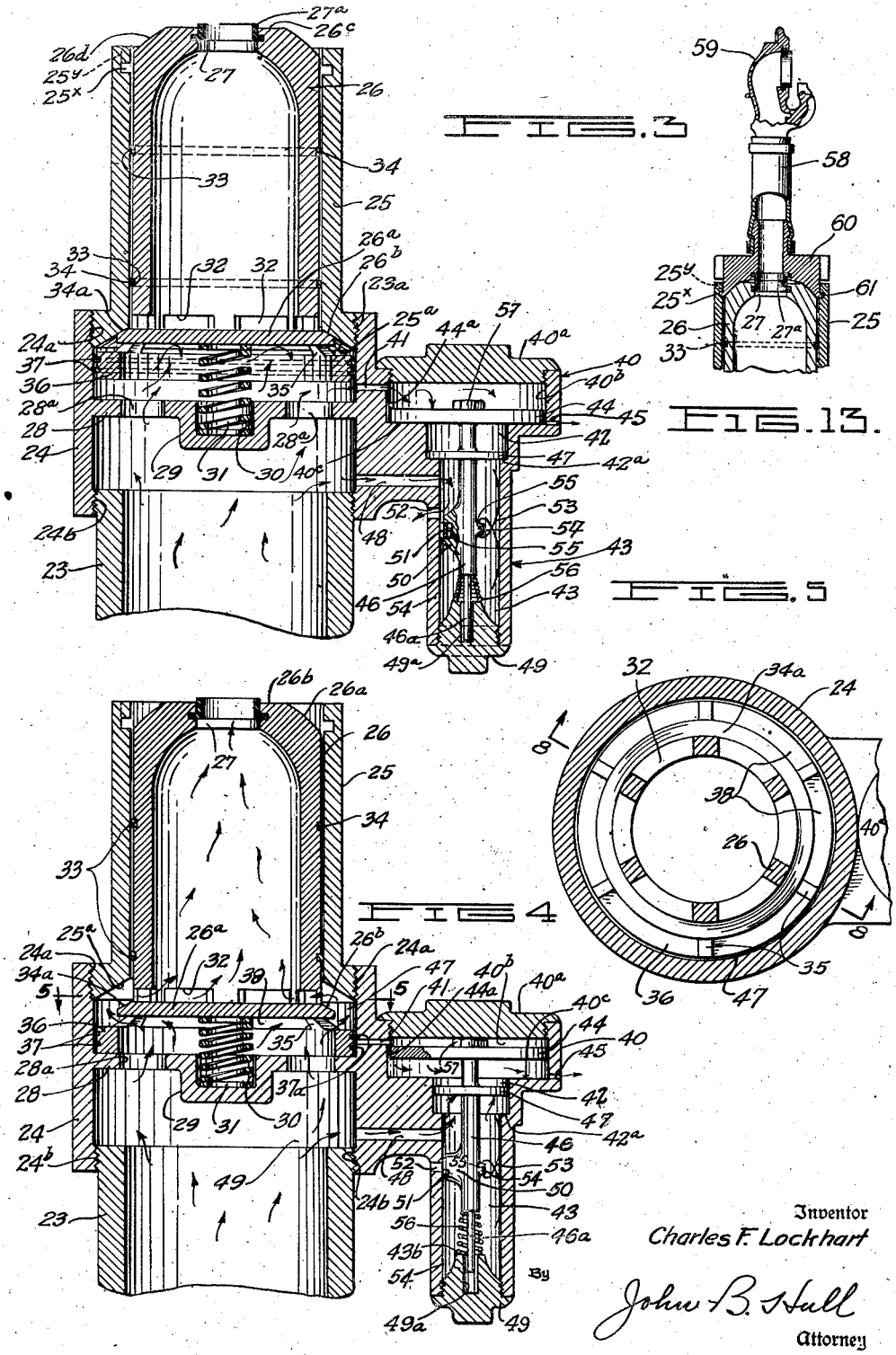

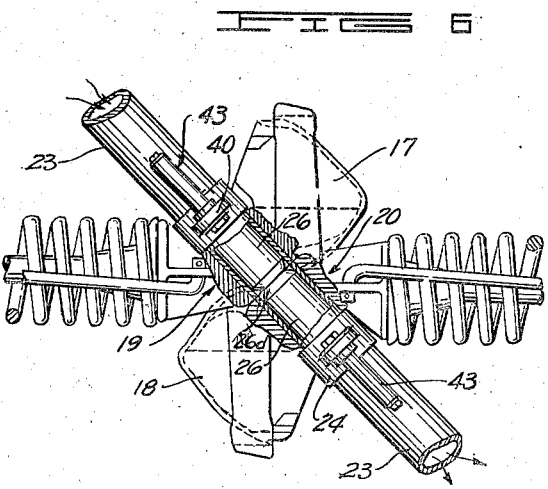
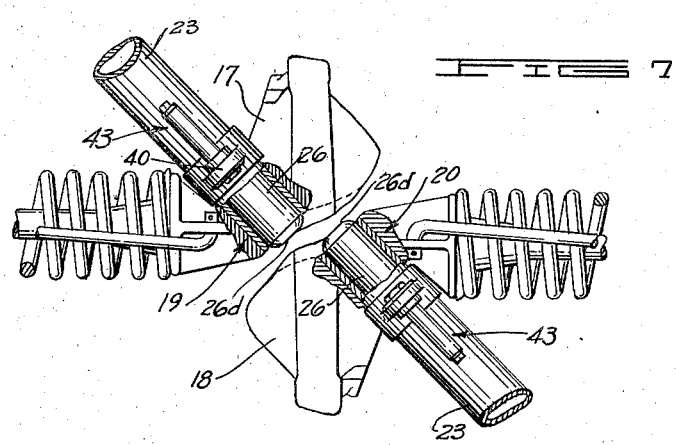
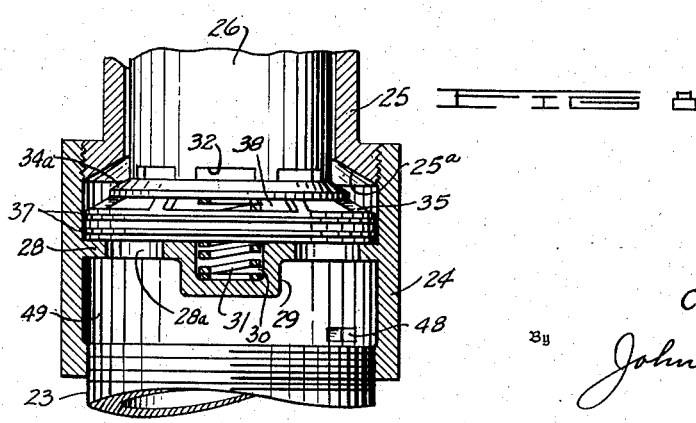

2,296,170

UNITED STATES PATENT OFFICE 2,296,170

MEANS FOR AUTOMATICALLY CONNECTING AND DISCONNECTING FLUID PRESSURE PIPES OF CARS

Charles F. Lockhart, Cleveland, Ohio, assignor of one-half to Harry D. Williams, Cleveland, Ohio Application May 6, 1941, Serial No. 392,105

9 Claims. (Cl. 284—5)

This invention relates to means for automatically connecting and disconnecting the air brake pipes of adjacent cars in a train and has for its general object to enable such connecting and disconnecting to be accomplished in a particularly efficient manner.

A further object of the invention is to enable these operations to be accomplished entirely automatically, whereby the necessity for exposing human beings to the hazards attendant upon operating adjacent to the ends of cars during the connecting and/or disconnecting operations will be eliminated.

I accomplish the foregoing objects and other and more limited objects to be set forth hereinafter in and through the construction and arrangement of parts shown in the drawings hereof, wherein Fig. 1 represents a side elevation of adjacent end portions of two coupled cars of a train, the drawbars of the said cars being provided with connector heads equipped with connector units having my invention embodied therein; Fig. 2 a fragmentary view similar to Fig. 1 and showing the coupler heads and the connector heads separated; Fig. 3 a sectional view through one of my connector units, including an emergency relief valve and showing the parts in the positions which they occupy when the connector heads are separated, as by the uncoupling of cars provided with the same; Fig. 4 a view similar to Fig. 3 and showing the positions of the parts when the connector heads on the ends of adjacent cars are in operative relation to each other, thereby permitting the free flow of air through the connector units; Fig. 5 a sectional view taken on the line 5—5 of Fig. 4; Fig. 6 a plan view, partly in section, showing the positions of the plungers and bushings of a pair of my connector units when in operative engagement with each other; Fig. 7 a view similar to Fig. 6 showing the positions of the plungers and bushings when separated, as by the uncoupling of the cars by which they are respectively carried; Fig. 8 a fragmentary sectional view corresponding to the line 8—8 of Fig. 5; Fig. 9 a sectional elevation of a pair of connector units showing the capacity of the same for being brought into registration, even when the amount of their relative axial displacement is greatly exaggerated; Fig. 10 a detail in front elevation and Fig. 11 a detail in side elevation of a connector head equipped with my invention as used for connecting air brake pipes and steam lines; Fig. 12 a view similar to Fig. 6 showing my invention as used with steam lines; and Fig. 13 a detail in sectional elevation showing the manner in which one of my connector units is adapted to cooperate with the air brake hose of a car not equipped with such unit.

My improved connecting and disconnecting units may be conveniently applied to connector heads of the type shown and described in the patent to M. A. Barber, No. 1,347,836, issued July 27, 1920, and are shown herein as applied to such heads. It will be understood, however, that by such illustration, I do not limit myself in the use of my invention to this type of connector heads, except as the latter may be identified in claims hereof.

Referring to the drawings, 12 and 13 denote the adjacent ends of two cars of a train, provided respectively with the drawbars 14 and 15 and couplers 14ª and 15ª. 16 denotes one of the rails on which the cars are supported. A, B denote the flexible hose extending from the air brake pipes of the cars 12 and 13, respectively, to the connector heads 10 and 11, respectively, one of said pipes being indicated at X. These heads are yieldably supported by guide shanks 10ª and 11ª slidably mounted in brackets C and D, carried by and depending respectively from the couplers of the cars 12 and 13. Strong compression springs 10ᵇ and 11ᵇ surround the shanks 10ª and 11ª respectively and serve to press the heads into engagement with each other during the coupling operation. Bolts 10ᶜ and 11ᶜ, pivotally connected to the heads and extending through the brackets C and D and each provided with a nut on its free end, serve to limit the longitudinal movements of the heads and their shanks by the springs 10ª and 11ª when said heads are disconnected.

Each head is provided with an enlarged base 17 and 18, respectively, each base having at one side a conical projection 17ª and 18ª, respectively, and a recess E, the recess of one base being shaped and adapted to receive therewithin the conical projection on the other head (see Fig. 10), thereby to insure a close fit between the interconnected parts of the heads when in the position shown in Fig. 1 and to preserve an unbroken connection between the hose pipes A and B. The general construction of the connector heads is substantially the same as shown and described in the aforesaid Barber patent and in Moler Patent 1,161,403, granted November 23, 1915, and detailed illustration of the same herein is unnecessary.

As will appear from the drawings, each car is provided at each end thereof with the usual angle cock F at the junction of the air brake pipe X thereof with the hose extending to the connector head for said car. While the Barber patent referred to provides means for automatically connecting the air brake pipes of cars being coupled, it makes no provision for eliminating the necessity for manually closing the angle cocks when the cars are so uncoupled; and it is my belief that no railroad cars have been provided with any means whereby the necessity for closing these cocks can be avoided prior to uncoupling. Due to my invention as disclosed herein, the angle cocks may be left open, but my connecting units will function, not only to prevent wasteful and objectionable discharge of air from the air brake pipes, but to re-set the parts of said units for the next operation, and permit the brakes to be released and the train to be moved to any desired point. It will be evident that, because of this capacity for operation, there will be no necessity for exposing an operator to the hazard of closing an angle cock, should the latter be left open during and after the uncoupling operation.

The means disclosed herein whereby my units accomplish the foregoing objects comprises the following general mechanisms:

Mounted in said connecting heads, as by means of castings 19 and 20 comprising parts of said heads respectively, (see Figs. 6 and 7) are my units. Each of the said units is connected to the air hose (A or B) and comprises a main control valve adapted to be opened when the heads 10 and 11 are connected, thereby to permit the flow of air-brake air therethrough, and to be closed when said heads are disconnected, together with an auxiliary emergency air relief valve which, when the main valve is seated, will release the brake-pipe pressure to the atmosphere, thereby to set the brakes, and will thereafter cut off such amospheric release, thereby enabling the brakes to be released and the parts of the unit to be set for recharging the brake pipes and for the next coupling operation.

Describing the details of the aforesaid mechanism of my units by which these results are obtained, 23 denotes a sleeve carried by each of the heads 10 and 11, and to one end of which the hose A and B are respectively connected. The opposite end of each sleeve is threaded into one end of a cylindrical body 24, forming with the sleeve and the hose A or B a duct through which air from the brake pipe may pass to the main control valve. The body 24 may be conveniently cast with the base of each connecting head in such manner that the end of one of the plungers 26 (to be described), which unseats the main control valve will project from a portion of the base of one of said heads in position to be engaged by the end of the plunger projecting from the corresponding portion 18ᵃ of the other head—see Figs. 2 and 10.

As the valve mechanisms of the units carried by the heads 10 and 11 are identical in construction, the complete details of only one of such mechanisms are shown in the drawings—see Figs. 3, 4 and 5.

The body 24 is interiorly threaded at its opposite ends, as shown at 24ᵃ and 24ᵇ. The thread 24ᵇ receives the exteriorly threaded end of the sleeve 23, while the thread 24ᵃ receives the external thread at one end of the bushing 25, said bushing being fitted under heavy pressure within the connector head casting 19 or 20. This bushing forms a guide for a plunger 26 having an aperture 27 through its upper end adapted to register with a like aperture in the end of the plunger of the valve carried by the opposite cooperating connector head. The threaded end of the bushing 25 is provided with a frusto-conical valve seat 25ᵃ. The plunger 26 carries adjacent to its lower end a valve disk 26ᵃ having at its periphery a frusto-conical surface 26ᵇ adapted to engage the seat 25ᵃ, thereby to shut off the flow of air through the sleeve 23 and plunger 26. For the purpose of holding this valve to its seat when the connector heads are separated, a partition 28 extends across the cylindrical body 24, between the ends of the latter, said partition being provided with openings 28ᵃ therethrough and having a central projection 29 extending therefrom and providing a seat 30 for one end of an expansion spring 31, the opposite end of which engages the central portion of the valve 26ᵃ. When the valve is seated the outer end of the plunger projects beyond the outer end of the bushing.

The plunger 26 is provided with ports 32 located above the valve 26ᵃ and is also provided with circumferential grooves 33 having packing rings 34 therein for the purpose of preventing leakage of air between the body of the plunger and the bushing. The valve 26ᵃ is connected by downwardly and outwardly extending brackets 35 with a combined guide and valve ring 36 which is provided with packing rings 37 mounted in grooves 37ᵃ extending circumferentially therearound, said valve ring fitting within the cylindrical chamber of the body 24 and serving to insure proper spacing of the periphery of the main valve, when opened, and its alignment with its seat and the packing rings preventing leakage of air between the exterior of said ring and the surrounding wall of said chamber. Ports 38 are provided between the brackets 35 for the delivery of brake-pipe air around the periphery of the valve 26ᵃ and thence through the ports 32 above the said valve into the body of the plunger, when the parts of the valve are in the positions shown in Fig. 4, which are the positions which the said parts will normally assume when the heads 10 and 11 are connected, as shown in Fig. 1.

It will be noted that the upper or outer end of each plunger is provided with a plane or flat surface 26ᶜ surrounding the aperture 27 and with a beveled surface 26ᵈ extending outwardly and downwardly from the flat surface. This construction enables the plungers of opposite units to cooperate with each other in enabling the bushings on their connecting heads to be brought into register by the time the said heads are connected, even though there may be some misalignment of the plungers and bushings prior to the completion of such connection. The manner in which the plungers cooperate to secure this result is shown on an exaggerated scale in Fig. 7, wherein it will be seen that, due to the beveled surfaces 26ᵈ, a camming action will be exercised by the plungers upon each other as the units are moved into alignment, whereby the plungers and bushings will assume the positions shown in Figs. 6 and 12 when the heads 10 and 11 are fully connected. In practice, the bushings and plungers will be so located with respect to the positions of the heads 10 and 11 when the latter are fully seated that they will not be more than ¼" off center, when the plungers are first engaged, even under extreme conditions.

Each plunger is provided within the outer end of the port or aperture 27 with a gasket 27ª, said gaskets providing an air tight passage from the plunger of one connector head through the plunger of another connector head when the said heads are connected as shown in Fig. 1.

With the parts constructed and arranged as thus far described, it will be evident that, when the heads 10 and 11 are completely connected, an uninterrupted passageway will be provided for the air for braking purposes from car 12 to car 13—assuming that car 12 is nearer the engine than is car 13. It will also be apparent that, when the cars 12 and 13 are uncoupled, the valve 26ª will be seated by the pressure of the air there-against and by the action of the expansion spring 31, whereby, in the event that the angle cocks have not been closed prior to uncoupling, there will be no escape of air through the hose A and B or either of them except as herein set forth.

However, it is highly desirable to provide automatic valve mechanism capable of realizing the results described herein with emergency mechanism for setting the brakes for a short interval of time and for thereafter enabling the brakes to be released and the parts to be reset in position to enable the recharging of the brake pipes. In the embodiment of my invention shown in Figs. 1-11 herein, I have accomplished this result by incorporating in each of my connector units an emergency relief valve mechanism, preferably located in a casing forming an integral part or extension of the cylindrical body 24, and by utilizing the ring valve 36 as part of such emergency valve mechanism.

*Emergency valve mechanism*

Projecting from one side of the body 24 is a housing comprising a cylindrical body 40 having a cap 40ª threaded into the upper end thereof and providing a cylinder chamber 40ᵇ which I have designated as an actuating chamber, the upper end of said actuating chamber being normally connected with the interior of the body 24 by means of a port 41 located above the partition 28. Within the said housing and shown as located below the actuating chamber is a cylindrical chamber 42 which I have designated as an atmospheric chamber, there being an annular shoulder 40ᶜ provided between the said chambers. At the bottom of the cylinder 42 is an annular shoulder 42ª, and extending downwardly from said shoulder in the lower portion of the housing is a cylindrical chamber 43 which I have designated as a pressure equalizing chamber.

44 denotes a piston mounted in the chamber 40ᵇ and adapted to seat upon the annular shoulder 40ᶜ. Means are provided for permitting the passage of air from above the piston 44 to a vent port 45 located at the bottom of the chamber 40ᵇ by by-passing air around said piston. As shown herein, this by-passing is accomplished by fitting the piston somewhat loosely within the chamber 40ᵇ, as indicated on Figs. 3 and 4, whereby the piston may float in said chamber under conditions to be described hereinafter.

46 denotes a stem connected to the center of the piston 44 and depending therefrom centrally within the equalizing chamber 43. 47 denotes a piston mounted on said stem and fitting closely, and reciprocable, within the atmospheric chamber 42 and adapted, when in the position shown in Fig. 3, to be seated upon the annular shoulder 42ª. 48 denotes a port communicating with the lower portion of the chamber in the body 24 and with the interior of the chamber 43.

The lower end of the stem 46 is reduced in diameter, as shown at 46ª, and is received loosely within a bore 49ª provided in the cap 49, which is threaded into the lower end of the portion of the housing containing the chamber 43. The stem 46 is provided with a slide valve mounted in a recess provided in the outer side of a projection 50, the valve proper being shown at 51. This valve is adapted, through the reciprocation of the stem 46, to cover and uncover a vent port 52 leading to the atmosphere. The valve 51 is maintained in sliding engagement against the inner wall of the chamber 43 by means of a tension spring 53 having its central portion anchored within a slot provided therefor in a projection or lug 54 on the valve stem 46, being secured in place by a pin 55.

A cone compression spring 56, surrounding the reduced extension 46ª of the stem 46 and bearing at one end on top of the cap 49 and at its opposite end against a shoulder between the stem and the said extension, tends to raise the stem and the parts connected therewith to the positions shown in Fig. 4, at which time it will be noted that the port 41 is closed against communication with the interior of the body 24 by means of the valve ring 36.

With the parts constructed and arranged as described, when cars equipped with my brake pipe connector units are uncoupled, the plungers 26 are moved to the position shown in Fig. 3, whereby escape of air from the brake pipes connected to the sleeves 23 of these units through the plungers 26 is automatically cut off. However, the seating of the valve 26ª moves the valve ring 36 to a position where the port 41 is uncovered and, if the angle cock shall not have been closed, air under brake pipe pressure enters the actuating chamber in a greater volume than can escape through the vent port 45, thereby equalizing the pressure on both sides of the piston 44. Due to the fact that the area of the piston 44 is considerably greater than that of the piston 47 and to the equalizing of the pressure as pointed out, the piston 44 will be moved almost instantly to the position shown in Fig. 3. This movement of the piston 44 in turn seats the piston 47 against the shoulder 42ª and opens the vent port 52, whereupon air in the brake pipe line is released, such release causing the emergency setting of the brakes on all cars coupled to the engine. This escape of air proceeds until the pressure of air in the brake pipe and in the duct including the sleeve 23 falls sufficiently to enable the spring 56 to move the stem 46 and the parts connected therewith to the positions shown in Fig. 4, whereupon further escape of air from the brake pipe line through the port 52 is prevented. The spacer nut 57 will retain the piston 44 in the position shown in Fig. 4, where its upper surface will be exposed to pressure of air from the interior of the body 24 through the port 41.

In practice, each car of a train is provided with a triple valve, and each of said valves is equipped with an emergency device which, after having been once set for operation, cannot be released for a period of some three minutes. This emergency device also operates to release air to the atmosphere and cooperates with the vent port 52 in obtaining practically instantaneous application of the brakes when the cars are uncoupled. My emergency device will operate in less than one-third of the time required for the triple-valve emergency devices to complete their operation. This provides ample time for my emergency device to complete its cycle of operations and permit the parts of the complete valve mechanism to be reset in positions which will permit the brake pipe lines of the cars to be recharged, before the emergency devices of the triple valves can be released. It will be noted that the port 48 is of materially greater cross sectional area than the port 41. Due to the proper proportioning of the cross sectional areas of these ports and to the proper rate of leakage of air through the actuating chamber past the piston 44, the parts will remain in the positions shown in Fig. 3 while the pressure in the air brake pipe is being built up after the venting operation, even though the port 41 at this time is uncovered by the ring 36. In practice, this leakage around the piston 44 is at a rate not to exceed 7# per minute, as shown by the engineer's air pressure gauge on the locomotive, the leakage equalizing the pressure on both sides of the piston.

In Figs. 10 and 11 I have shown, respectively, a diagrammatic front elevation and a side elevation of a coupler and one of the connecting heads having an air hose A connected therewith and with one of my units, the plunger whereof is indicated at 26. The head is also provided with two units which are not equipped with my emergency valve mechanism, one of said units receiving steam through the coupling H' and hose H, said hose leading from the valve G, and the other of said units being connected with the hose J which supplies steam for signalling purposes. The plunger of the unit supplied by the hose H is designated by the numeral 26ˣ and the plunger of the unit supplied by the hose J is designated by the numeral 26ʸ.

In Fig. 12 I have shown a view similar to Fig. 6 which shows the type of units with which the pipes H and J communicate on Figs. 10 and 11 and wherein it will be noted no emergency relief valve mechanism is provided.

It will be noted that the bushing of each of my units is provided within the interior thereof with slots extending longitudinally downwardly from the outer or delivery end thereof and each merging at its base with a circumferentially extending groove. The circumferentially extending grooves are indicated at 25ˣ and one of the vertical slots is indicated in dotted lines at 25ʸ (see Figs. 3 and 13). This construction is provided for the purpose of enabling a car equipped with my connector units to be conveniently connected to the present M. C. B. air brake hose coupling through the use of an adapter head. The manner in which this connection can be made is shown more or less diagrammatically in Fig. 13, wherein a hose 58 is provided at one end with a standard type of head 59 whereby it may be connected to and disconnected from a similar head on an air hose of an adjacent car. The outer end of the hose is connected with an adapter head 60 having its outer end shaped to conform to the outer end of the plunger 26 and provided at said outer end with a pair of lugs 61 which are adapted to be entered in the vertical slots 25ʸ and, by rotation in a suitable direction, to be anchored within the circumferentially extending grooves 25ˣ—the foregoing effecting a bayonet-joint connection between the air hose 58 and my unit. The parts are so proportioned that, when the lugs 61 are seated within the circumferentially extending grooves 25ˣ, the outer end of the plunger will be in the plane of the outer end of the bushing and the valve 26ᵃ connected with said plunger will be in the unseated position shown in Fig. 4.

For convenience of exposition, in some instances in the description and in some of the claims, the parts have been assumed to be in the positions shown in Figs. 3 and 4, and the terms "top" and "bottom" and the terms "upper" and "lower" have been employed to designate the relations of said parts but without any intent to limit the parts when in use to such positions.

Having thus described my invention, what I claim is:

1. Means for automatically connecting and disconnecting the air brake pipes of cars, the said means comprising connector heads supported from the end portions of cars and each adapted to be brought into engagement with a like connector head on an adjacent car when said cars are coupled, a duct connecting the brake pipe of each of said cars with each connector head, valve mechanism carried by each connector head for automatically permitting the flow of air from the brake pipe of one car to the brake pipe of another car through said ducts and heads when said cars are coupled, the said valve mechanism comprising a main control valve within the duct connected with each of said heads and adapted to be opened by the engagement of connector heads on cars so coupled and to be automatically closed by the separation of said connector heads due to uncoupling, an emergency valve mechanism carried by each of said connector heads and adapted to vent to the atmosphere, for a limited time, air in the brake pipe connected to said head, and thereafter to eliminate such venting operation, the said emergency valve mechanism comprising a housing having an equalizing chamber, there being a port connecting said chamber with the said duct, and the said chamber being provided with a port for venting the same to the atmosphere, the said housing also having an actuating chamber therein, a piston in said actuating chamber, a stem connected with said piston and extending into the first mentioned chamber, a valve on said stem adapted through the reciprocation of the piston to open and close the venting port, there being a port for supplying air from the duct into the actuating chamber thereby to move the actuating piston in a direction to cause the valve to uncover the venting port, the said actuating chamber being provided with means permitting seepage of air supplied thereto beyond said piston to the atmosphere, and means for automatically moving the stem and the actuating piston connected therewith in a direction to cause the valve to close the venting port when the pressure in said duct has been reduced to the desired extent.

2. Means for automatically connecting and disconnecting the air pipes of cars, the said means comprising connector heads supported from the end portions of cars and each adapted to be brought into engagement with a like connector head on an adjacent car when said cars are coupled, a duct connecting the brake pipe of each of said cars with each connecter head, valve mechanism carried by each connector head for automatically permitting the flow of air from the brake pipe of one car to the brake pipe of another car through said ducts and heads when said cars are coupled, the said valve mechanism comprising a main control valve within the duct connected with each of said heads and adapted to be opened by the engagement of connector heads on cars so coupled and to be automatically closed by the separation of said connector heads due to uncoupling, an emergency valve mechanism carried by each of said connector heads and adapted to vent to the atmosphere, for a limited time, air in the brake pipe connected to said head, and thereafter to eliminate such venting operation, the said emergency valve mechanism comprising a housing having an equalizing chamber, there being a port connecting said chamber with the said duct, and the said chamber being provided with a port for venting the same to the atmosphere, the said housing having an actuating cylindrical chamber spaced from the first mentioned chamber and located adjacent to but below the main control valve, the said housing also having an atmospheric chamber of smaller cross sectional area than the actuating chamber extending downwardly from and constituting an extension of the latter chamber and located between the latter chamber and the first mentioned chamber and constituting an upper extension of the first mentioned chamber and being of greater cross sectional area than the first mentioned chamber, an actuating piston in the actuating chamber, a stem connected with the actuating piston and extending through the atmospheric chamber and into the first mentioned chamber, a piston on said stem in the atmospheric chamber, a valve on said stem adapted by its movement to cover and uncover the inner end of the venting port, a spring within the first mentioned chamber for lifting the stem and the pistons connected thereto, there being a port adapted to establish communication between the upper portion of the actuating chamber and the duct at a point adjacent to but below the main control valve, the actuating chamber being provided with a vent port adjacent to the bottom thereof and there being means permitting air to pass beyond said piston and to said port.

3. Means for automatically connecting and disconnecting the fluid-pressure pipes of cars, the same comprising connector heads supported from the end portions of cars and each adapted to be brought into engagement with a like connector head on an adjacent car when said cars are coupled, each connector head being provided with a tapered projection and with a recess adapted to receive and seat the tapered projection of an opposed connector head, a duct connecting the brake pipe of each of said cars with its connector head, valve mechanism carried by each of said heads and each of said mechanisms comprising: a bushing included in said duct and so positioned as to enable the outer ends of the bushings on the connector heads of adjacent cars to be brought into alignment by the engagement of the said projections with the said recesses and to be maintained in engagement with each other when the cars are coupled; a plunger slidably mounted in said bushing and having a valve connected thereto at the inner end portion thereof; a cooperating valve seat in said duct adapted to be engaged by said valve thereby to control the flow of pressure fluid through said bushing, the outer end of said plunger projecting beyond the bushing when the valve is seated; and yieldable means for holding the valve seated and the outer end of the plunger projecting beyond the bushing.

4. Means for automatically connecting and disconnecting the fluid pressure pipes of cars, the same comprising connector heads supported from the end portions of cars and each adapted to be brought into engagement with a like connector head on an adjacent car when said cars are coupled, a duct connecting the brake pipe of each of said cars with its connector head, said duct including a cylindrical chamber, a bushing connected to the upper end of said chamber and having a passage for pressure fluid therethrough and provided at its lower end with a valve seat, a plunger sleeve slidably mounted in the said bushing and having at its lower end a valve extending transversely thereof and adapted to engage the valve seat, and a guide ring extending downwardly from the said valve and adapted to slidably engage the inner cylindrical wall of the said chamber, there being ports provided between the said guide ring and the periphery of the valve and between the periphery of the valve and the interior of the plunger sleeve, and yieldable means for forcing the valve to its seat, the outer end of the plunger sleeve projecting beyond the end of the bushing when the said valve is seated, said ring also controlling a port leading from said chamber to an emergency valve mechanism for venting, for a limited time, air in the brake pipe connected to said duct and head.

5. Means for automatically connecting and disconnecting the air brake pipes of cars, the said means comprising connector heads supported from the end portions of cars and each adapted to be brought into engagement with a like connector head on an adjacent car when said cars are coupled, a duct establishing connection between the brake pipe of each of said cars and each connector head, valve mechanism carried by each connector head for automatically controlling the flow of pressure fluid from the brake pipe of one car to the brake pipe of another car through said heads when said cars are coupled and uncoupled, the said valve mechanism comprising: a main control valve in said duct and carried by each connector head and adapted to be opened by the engagement of connector heads on cars so coupled and to be automatically closed by the separation of said connector heads due to uncoupling; emergency valve mechanism for venting the said duct, there being a port for supplying pressure fluid to said emergency valve mechanism from said duct; and means carried by said main control valve and extending along the inner wall of said duct and adapted to close communication from said duct through said port to the emergency valve mechanism when the main control valve is open and to establish communication between the said duct and the said emergency valve mechanism through said port when the main control valve is closed.

6. Means for automatically connecting and disconnecting the fluid-pressure pipes of cars, the same comprising connector heads supported from the end portions of cars and each adapted to be brought into engagement with a like connector head on an adjacent car when said cars are coupled, each connector head being provided with a tapered projection and with a recess adapted to receive and seat the tapered projection of an opposed connector head, a duct connecting the brake pipe of each of said cars with its connector head, valve mechanism carried by each of said heads and each of said mechanisms comprising: a main control valve in said duct located behind the outer surface of the tapered projection of a connector head and having an operating portion projecting beyond the outer surface of the said projection in position to be engaged by the operating portion of the control valve carried by a like connector head of an adjacent car; an emergency valve mechanism located behind the said projection and embodying means for venting pressure fluid from the duct, there being a port for supplying pressure fluid from the duct to the said emergency valve mechanism; and means operating when the main control valve is opened for closing communication from said duct to the emergency valve mechanism through said port.

7. In the means for automatically connecting and disconnecting the air pipes of cars as set forth in claim 2, means controlled by the opening of the main control valve for closing the port leading into the actuating chamber.

8. Means for automatically connecting and disconnecting the fluid-pressure pipes of cars, the same comprising connector heads supported from the end portions of cars and each adapted to be brought into engagement with a like connector head on an adjacent car when said cars are coupled, a duct connecting the brake pipe of each of said cars with its connector head, valve mechanism carried by each of said heads and each of said mechanisms comprising: a bushing included in said duct and so positioned as to enable the outer ends of the bushings on the connector heads of adjacent cars to be brought into alignment and maintained in engagement with each other when the cars are coupled; a plunger slidably mounted in said bushing and having a valve connected thereto at the inner end portion thereof; a valve seat in said duct adapted to be engaged by said valve, the said plunger having a passageway extending longitudinally therethrough controlled by said valve and seat, the outer end of said plunger projecting beyond the bushing when the valve is seated and being provided with a centrally located outlet opening; and yieldable means for holding the valve seated and the outer end of the plunger projecting beyond the bushing, the said plunger having a tapered peripheral surface located exteriorly of the outlet opening.

9. In the means for automatically connecting and disconnecting the fluid pressure pipes of cars as set forth in claim 8, means for preventing the leakage of pressure fluid between the exterior surface of the plunger and the interior surface of the bushing.

CHARLES F. LOCKHART.